US009232492B2

(12) United States Patent
Oka et al.

(10) Patent No.: US 9,232,492 B2
(45) Date of Patent: Jan. 5, 2016

(54) CELLULAR TOWER DISAMBIGUATION FOR USE IN GEO-LOCATION OF MOBILE DEVICES

(71) Applicant: Research In Motion Limited, Waterloo (CA)

(72) Inventors: Anand Ravindra Oka, Redmond, WA (US); Sean Bartholomew Simmons, Waterloo (CA); Khenaidoo Nursimulu, Kanata (CA)

(73) Assignee: BlackBerry Limited, waterloo, Ontario (CA)

( * ) Notice: Subject to any disclaimer, the term of this patent is extended or adjusted under 35 U.S.C. 154(b) by 163 days.

(21) Appl. No.: 13/778,334

(22) Filed: Feb. 27, 2013

(65) Prior Publication Data
US 2014/0243010 A1 Aug. 28, 2014

(51) Int. Cl.
*H04W 64/00* (2009.01)
*G01S 5/02* (2010.01)

(52) U.S. Cl.
CPC ............. *H04W 64/00* (2013.01); *G01S 5/0236* (2013.01); *G01S 5/0242* (2013.01); *G01S 5/0252* (2013.01)

(58) Field of Classification Search
CPC ................................................... H04W 64/00
USPC ....................................................... 455/456.1
See application file for complete search history.

(56) References Cited

U.S. PATENT DOCUMENTS

| 8,195,190 | B1 * | 6/2012 | Hou | 455/432.2 |
|---|---|---|---|---|
| 2006/0217116 | A1 * | 9/2006 | Cassett | 455/423 |
| 2007/0021126 | A1 * | 1/2007 | Nanda et al. | 455/456.1 |
| 2008/0161012 | A1 * | 7/2008 | Haran | |
| 2009/0310585 | A1 | 12/2009 | Alizadeh-Shabdiz | |
| 2010/0323633 | A1 * | 12/2010 | Pani et al. | 455/67.14 |
| 2012/0009940 | A1 * | 1/2012 | Schmitt et al. | 455/456.1 |
| 2012/0295641 | A1 * | 11/2012 | Tsuda | 455/456.6 |
| 2013/0028248 | A1 * | 1/2013 | Cho | 370/338 |
| 2013/0300761 | A1 * | 11/2013 | Ahmed | |

OTHER PUBLICATIONS

Extended European Search Report from related European Patent Application No. 13157066.5 dated Jul. 24, 2013; 7 pages.

* cited by examiner

*Primary Examiner* — Qun Shen
(74) *Attorney, Agent, or Firm* — Thomas Grzesik; Fleit Gibbons Gutman Bongini & Bianco P.L.

(57) ABSTRACT

Determining a geo-location estimate of a mobile device determined based on detected radio transmitters needs to uniquely identify at least one of the visible cellular towers. The estimate may be improved if multiple cellular towers can be uniquely identified. However, mobile devices may not determine unique identifiers for each visible cellular tower based upon configuration of the cellular radio protocol stack implementation. It is possible to disambiguate non-unique parameters detected at a mobile device to unique IDs of the cellular towers to aid in geo-location. The disambiguation is accomplished using disambiguation information that is associated with the cellular tower the mobile device is currently camped on.

20 Claims, 10 Drawing Sheets

CELLULAR TOWER DISAMBIGUATION FOR USE IN GEO-LOCATION OF MOBILE DEVICES

TECHNICAL FIELD

The current description relates to cellular tower identification and in particular to disambiguating non-unique cellular tower identifiers for use in geo-location of mobile devices.

BACKGROUND

The location of cellular towers, or base-stations, can be used in determining a mobile devices location. A mobile device may receive or detect signals from multiple cell towers at a time, although the mobile device is only in communication with a particular cell tower at a time. The mobile device will camp on a cell tower, that is the mobile device is associated with the particular cell tower, and can communicate using that cellular tower.

FIG. 1 depicts a simplified environment for depicting how cellular tower locations may be used in determining the location of a mobile device. The environment 100 comprises a plurality of cellular towers 102a, 102b, 102c that transmit and receive radio frequency signals. Each cell tower 102a, 102b, 102c has an associated unique identifier depicted as T1, T2, T3 respectively and a location A, B, C respectively. A mobile device 104 may receive radio frequency (RF) signals from one or more of the cellular towers 102a, 102b, and 102c. If the mobile device 104 is able to identify the unique identifiers associated with each of the cellular towers the mobile device sees, the locations associated with the visible towers may be retrieved, for example from a network service, and used to determine an estimate of the location of the mobile device 104. The location of the mobile device 104 is depicted in FIG. 1 as being a simple centroid, or average of the position of the three visible cellular tower 102a, 102b, 102c. Although it is possible to estimate the mobile device's location as a simple centroid, it is possible to estimate the location using different techniques. For example the strength of the signals received from the cellular towers may be used as a weighting value in determining the location estimate. Further, the location of the mobile device may be estimated using fingerprint based techniques that use the radio scene, that is the towers that are visible and their signal strengths, detected at the mobile device and compares it to previously captured radio scenes that are associated with known locations. Regardless of how the location of the mobile device is estimated, it is beneficial if all of the cellular towers that a mobile device sees, that is the cellular towers from which RF signals are detected at the mobile device, can be uniquely identified.

A mobile device only needs to know the unique cellular tower identifier (ID) of the cell tower it is currently camped on. Although it is possible for a mobile device to determine the unique cellular tower identifier of all visible cellular towers, doing so requires additional power consumption, and as such it is typically avoided in mobile devices in order to increase battery life. Although the mobile device does not detect the unique cell tower ID of all visible towers, it does detect non-unique tower parameters of the other visible towers. For example, the non-unique tower parameters may comprise UTRA Absolute Radio Frequency Channel Number (UARFCN) and a Primary Scrambling Code (PSC). Both the UARFCN and the PSC are non-unique parameters that are re-used throughout the network. However, the network architecture typically requires that the UARFCN and PSC of neighboring towers, that is cellular towers that are within the reception area of a mobile device at some location, do not overlap.

Although the unique tower ID of the tower the mobile device is camped on as well as the non-unique tower parameters of the other visible neighboring towers may be used to provide an estimate of the mobile device's location, it would be desirable to be able to uniquely identify the visible neighboring cell towers for use in determining the mobile device's location without requiring the mobile device to expend additional power.

BRIEF DESCRIPTION OF THE DRAWINGS

Various embodiments are described with reference to the figures, in which.

DETAILED DESCRIPTION

Figure 1:
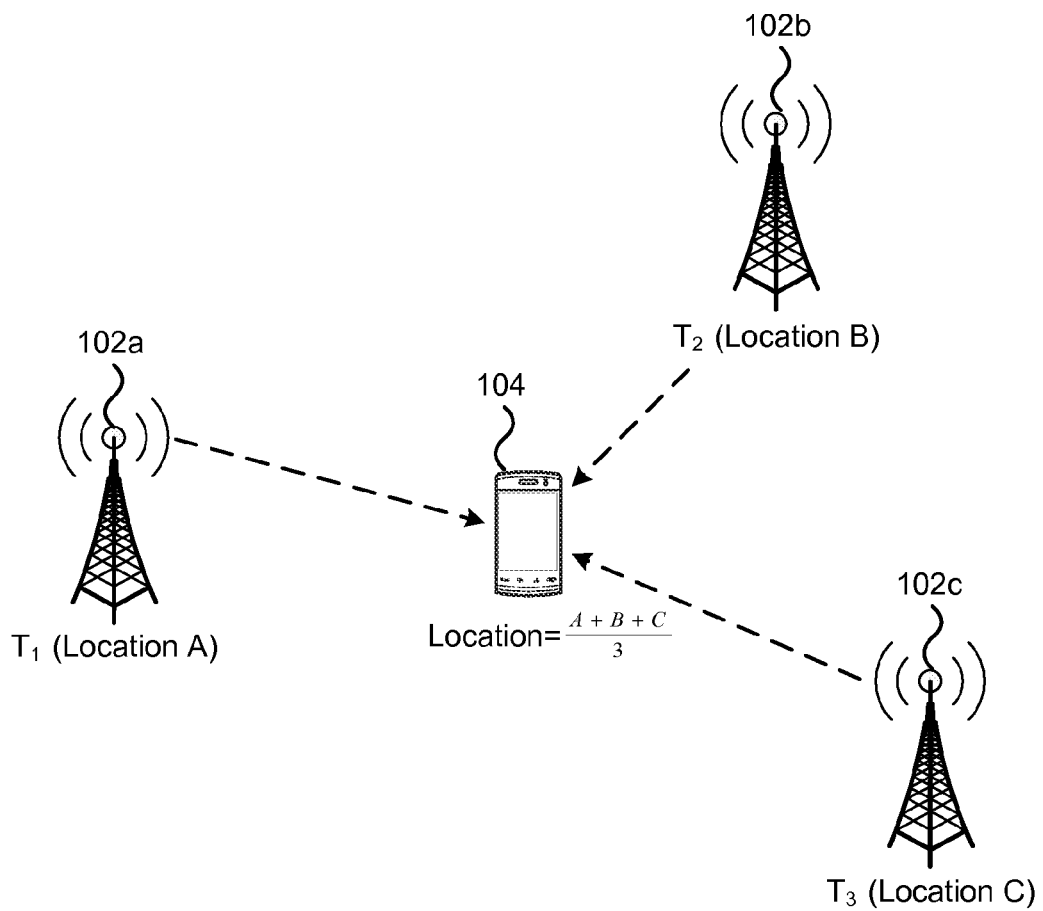
FIG. 1 depicts a simplified environment for depicting how cellular tower locations may be used in determining the location of a mobile device.

In accordance with an aspect of the present disclosure there is provided a method cellular tower disambiguation for use in geo-location of mobile devices. The method comprising: accessing a plurality of radio scenes detected by a plurality of mobile devices. Each of the plurality of radio scenes comprising: a unique tower identifier (ID) of a cellular tower that a mobile device that detected the respective radio scene was camped on when the radio scene was detected; and a non-unique neighboring tower parameter of at least one neighboring cellular tower detected by the mobile device. From the plurality of radio scenes generating ID disambiguation information for a plurality of the unique tower IDs of the plurality of radio scenes, the ID disambiguation information of a respective unique tower ID for use in resolving at least one non-unique neighboring tower parameter of a subsequent radio scene detected by a mobile device camped on the tower associated with the respective unique tower ID.

In accordance with yet another aspect of the present disclosure there is provided a system for cellular tower disambiguation for use in geo-location of mobile devices. The system comprising: a processor for executing instructions; and a memory coupled to the processor. The memory for storing instructions which when executed by the processor configure the system to access a plurality of radio scenes detected by a plurality of mobile devices. Each of the plurality of radio scenes comprising: a unique tower identifier (ID) of a cellular tower that a mobile device that detected the respective radio scene was camped on when the radio scene was detected; and a non-unique neighboring tower parameter of at least one neighboring cellular tower detected by the mobile device. From the plurality of radio scenes the processor configures the system to generate ID disambiguation information for a plurality of the unique tower IDs of the plurality of radio scenes, the ID disambiguation information of a respective unique tower ID for use in resolving at least one non-unique neighboring tower parameter of a subsequent radio scene detected by a mobile device camped on the tower associated with the respective unique tower ID.

In accordance with still yet another aspect of the present disclosure there is provided a non-transitory computer readable memory, containing instructions for execution by a processor. The instructions comprising: accessing a plurality of radio scenes detected by a plurality of mobile devices. Each of the plurality of radio scenes comprising a unique tower identifier (ID) of a cellular tower that a mobile device that detected the respective radio scene was camped on when the radio scene was detected; and a non-unique neighboring tower parameter of at least one neighboring cellular tower detected by the mobile device. From the plurality of radio scenes generating ID disambiguation information for a plurality of the unique tower IDs of the plurality of radio scenes, the ID disambiguation information of a respective unique tower ID for use in resolving at least one non-unique neighboring tower parameter of a subsequent radio scene detected by a mobile device camped on the tower associated with the respective unique tower ID.

When satellite based location signals, such as Global Positioning System (GPS) is not available, a user, or more particularly the user's mobile device, can be geo-located by a radio scene received at the mobile device and mapping it to an estimate of the device's latitude and longitude via some kind of model or rule. The radio scene comprises a list of all the radio transmitters the mobile can see, or rather detect, such as cellular towers, and their respective signal strengths. The mapping from radio scene to geographical location (geo-location) can be performed using techniques like trilateration, which are based on a simplified theoretical model of radio signal propagation and known locations of the radio transmitters. Alternatively, the mapping can be done based on a predictive model learnt under supervision, such as in fingerprinting. In any case, as a general rule, the more detailed and descriptive the radio scene report, the more accurate is the mapped estimate of the user's geo-location. In particular, it is desirable to unambiguously identify as many of the neighboring visible transmitters as possible.

In any typical cellular radio protocol stack implementation on a mobile device such as a smart phone, when a user camps on a particular tower, often referred to as the base-station, all the pertinent information about the base-station is deciphered by the mobile device by listening to certain types of transmissions made by the cellular tower. This information includes the tower's globally unique cell ID, as well as its radio parameters like its frequency code (UARFCN) and scrambling code (PSC). Acquiring this information for the base-station is a compulsory requirement of the cellular standard, since otherwise communication cannot proceed between the mobile device and the base-station. From the point of view of the mobile device the cellular tower that it can establish communication with is considered to be the base-station tower or simply the base-station for brevity. The mobile device may be able to see or detect signals received from other neighboring towers, however the neighboring cellular towers are not considered base-stations for the mobile device as the mobile device does not have the required base-station information. It will be appreciated that the neighboring towers will be the base-station for other mobile devices.

However, in most protocol stack implementations, only partial information about other visible towers is acquired. This is because energy resources have to be wasted in keeping the mobile device radio ON and listening to all the appropriate transmissions of neighboring towers. Since listening for the detailed information on neighboring towers is not necessary for normal cellular communication, this has been made optional in the standard and hence is often not implemented by the vendors, in order to improve energy efficiency. As a result, other than the base-station, the mobile device is not aware of its visible neighboring towers in terms of their globally unique cell IDs. Rather the mobile device is only aware of partial, and so non-unique, radio parameters of the cellular towers neighboring the base-station. However, because of performance concerns, some radio stacks return only partial parameters for the neighbor cells. Every radio technology has non-unique parameters that are provided in the radio stack. For example, Long-term Evolution (LTE) provides a UARFCN and PCI (physical cell id), Wideband Code Division Multiple Access (W-CDMA) provides UARFCN and primary scrambling code (PSC), Global System for Mobile Communications (GSM) provides ARFCN and base station identity code (BSIC), and Code Divisional Multiple Access (CDMA): RegZone, pseudo-noise code (PN), and basestation ID (BaseID). The parameters are provided as an example of non-unique parameters that may be used in a radio scene, however other parameters may be utilized depending on the particular radio access technology.

That is, the protocol stack of the mobile device will not determine a complete list of unique neighbor cellular tower IDs, but rather only determines their UARFCN and PSC. Since the same UARFCN+PSC pair can be reused by the network for multiple towers, this information provides a non-unique identification of the cell ID of each neighbor tower. As such, the radio scene is ambiguous and cannot be as fruitfully used for geo-location as could be if all the neighboring towers were uniquely identified. Although the current description describes the non-unique tower parameters as being the UARFCN and PSC used in WCDMA, it will be appreciated that this is done for the clarity of the description and that the same techniques described herein can be applied to disambiguate the non-unique parameters of different cellular architectures that utilize different non-unique parameters.

Cellular architecture planning does not allocate the same UARFCN+PSC pair to towers that are in immediate radio vicinity of each other. This constraint is always satisfied because otherwise there would be a clash of the radio transmissions made by the towers on the same frequency and scrambling code and certain user caught in the middle of the two towers would have poor service. Hence, this property means the UARFCN+PSC is actually indeed a unique identifier of a tower in its immediate locale.

As described further herein the disambiguation technique for neighboring cellular tower IDs involves constructing a short disambiguation table for each tower T in the network. Each disambiguation table maps the non-unique tower parameters, such as UARFCN and PSC, of the neighboring towers to the neighboring towers' globally unique cellular tower IDs. Further, in addition to being a non-unique tower ID, the UARFCN and PSC assigned to a tower can be changed over time as the carrier may change the network, although this does not happen frequently. As such, the disambiguation tables should be able to be recalculated or updated every few months.

As described further below, the disambiguation table of every tower can be populated by looking at all the data of radio scene reports made by users in the vicinity of the tower along with the mobile devices' GPS locations at the time of the reports. First, by performing a pre-processing step over the data set of all user reports, a towers database can be generated that contains a record for every tower in the network or networks identified by its globally unique ID. The record of each tower further includes the tower's currently known non-unique tower parameters, such as UARFCN and PSC, as well as its currently estimated physical location, which may be found by using tower localization algorithms like the weighted centroid method.

Figure 2:
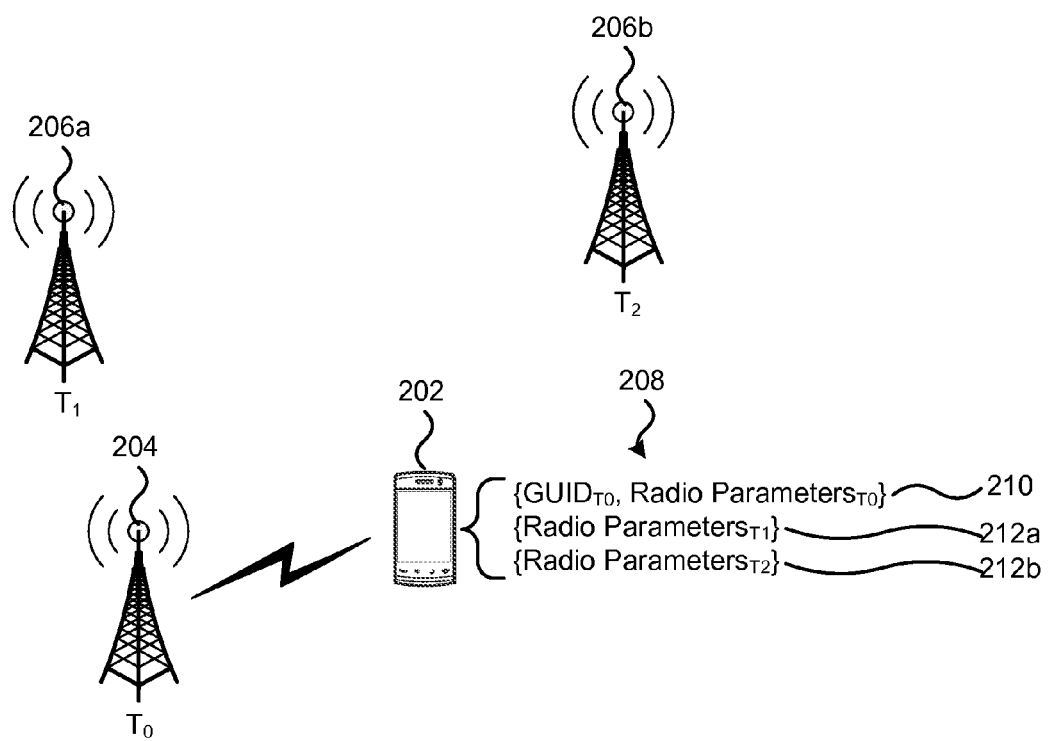
FIG. 2 depicts a simplified environment, in which disambiguation of non-unique tower parameters can be applied for geo-location of the mobile device.

FIG. 2 depicts a simplified environment, in which disambiguation of non-unique tower parameters can be applied for geo-location of the mobile device. A mobile device 202 is depicted as being camped on base-station tower $T_0$ 204. As depicted, the mobile device 202 can also detect signals from two other neighboring towers $T_1$ 206a, and $T_2$ 206b. The mobile device 202 detects a radio scene 208, which comprises the globally unique tower ID of the base-station (GUIDT$_o$) 210, that is, the tower the mobile device is camped on. The radio scene 208 may also include radio parameters of the base-station. The radio parameters in the radio scene may include the UARFCN and PSC of the cellular tower as well as information on the strength of the signals received. The radio scene may further comprise radio parameters 212a, 212b of the neighboring towers. The radio parameters of the neighboring towers may include non-unique tower parameters of the visible neighboring towers $T_1$ 206a, and $T_2$ 206b. As depicted in FIG. 2, the radio scene detected at the mobile device includes the globally unique identifier of the cellular tower the mobile device is camped on, as well as non-unique tower parameters of neighboring cellular towers. By disambiguating the non-unique parameters 212a, 212b of the neighboring towers to their associated globally unique IDs, the estimate of the mobile device's location may be improved.

Figure 3:
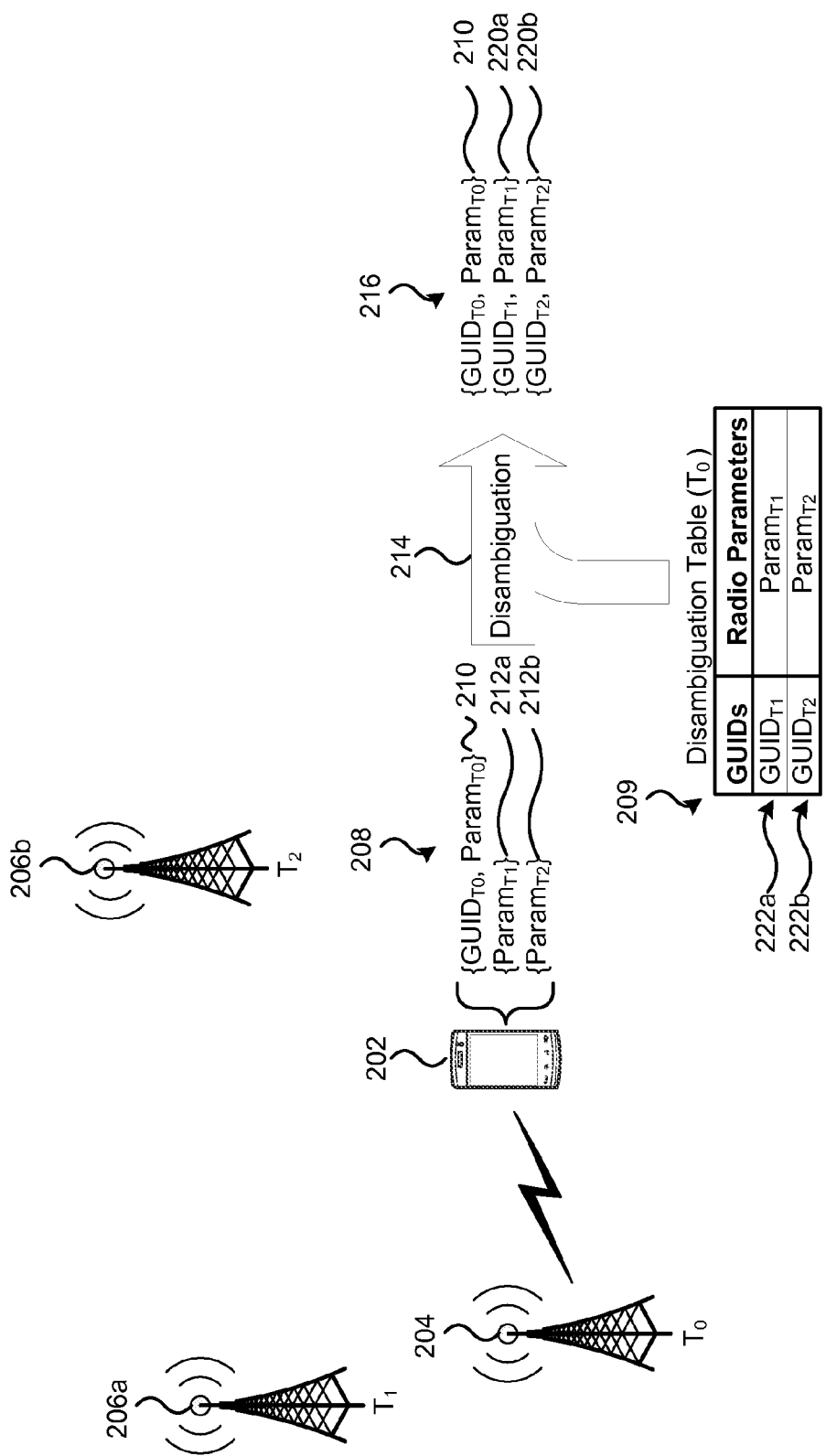
FIG. 3 depicts disambiguation of non-unique tower parameters.

FIG. 3 depicts disambiguation of non-unique tower parameters. The environment of FIG. 3 is the same as FIG. 2 and as such, components with the same reference numbers are not described again. The mobile device 202 detects the radio scene 208 that includes the globally unique ID 210 of the base-station tower 204 as well as the non-unique tower parameters 212a, 212b of the neighboring the towers 206a, 206b. A disambiguation process 214 can be performed to determine the globally unique ID of the neighboring towers 206a, 206b from the radio scene information.

For each tower in the network there is associated disambiguation information, depicted as disambiguation table for convenience, although other means of storing the disambiguation information are possible. The disambiguation process 214 uses the disambiguation information associated with the tower the mobile device was camped on when it captured the radio scene in order to determine the globally unique ID associated with the non-unique tower parameters. The tower the mobile device was camped on can be determined since the radio scene will include the globally unique ID of the base-station. Each disambiguation table associates globally unique IDs of towers neighboring the tower associated with the disambiguation table as well as the non-unique tower parameters used by the neighboring tower. Once the disambiguation process 214 has the disambiguation information associated with the globally unique ID 210 of the radio scene, each non-unique parameter 212a, 212b of the radio scene can be used to look up the associated globally unique IDs 222a, 222b in the disambiguation table. The radio scene 208 can then be disambiguated by replacing, or adding as depicted, the globally unique IDs 220a, 220b that were determined to be associated with the non-unique parameters in the radio scene. As such, the disambiguated radio scene 216 may comprise the globally unique ID and radio parameters 210 of the base-station/tower, which were included in the original radio scene 208, as well as the disambiguated globally unique IDs 220a, 220b determined from the non-unique parameters 212a, 212b of the original radio scene 208.

Figure 4:
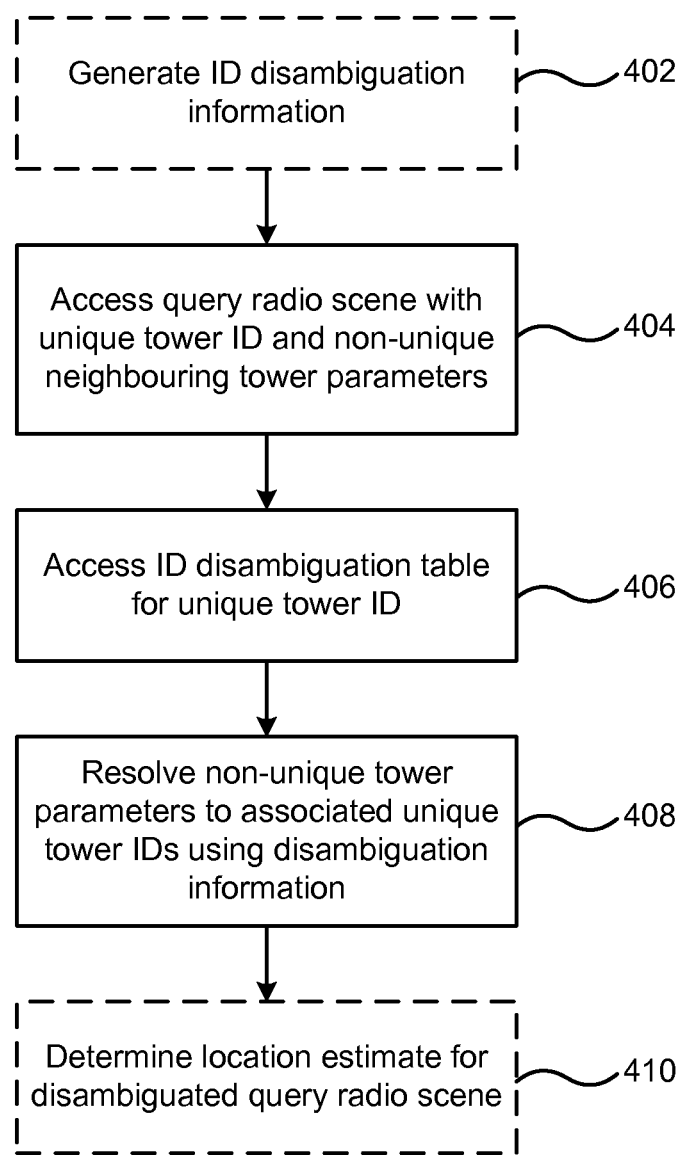
FIG. 4 depicts a method of disambiguation of non-unique tower parameters.

FIG. 4 depicts a method of disambiguation of non-unique tower parameters. The method 400 may include generating disambiguation information (402). As described further, the disambiguation information can be generated from a corpus of previously captured radio scenes, or may be generated and updated as new radio scenes are received. At some point after the disambiguation information is available; a query radio scene is accessed that includes a globally unique tower ID as well as one or more non-unique tower parameters of neighboring towers (404). The unique tower ID of the query radio scene is used to access the disambiguation table associated with the unique tower (ID) (406). As described above, the disambiguation information for a particular tower provides a mapping between non-unique tower parameters and globally unique IDs of the tower's neighbors. The disambiguation information is used to resolve the non-unique tower parameters to the globally unique IDs of the neighboring towers (408). Once the non-unique parameters are resolved, the disambiguated radio scene may be used to determine a location estimate for the mobile device (410).

Figure 5:
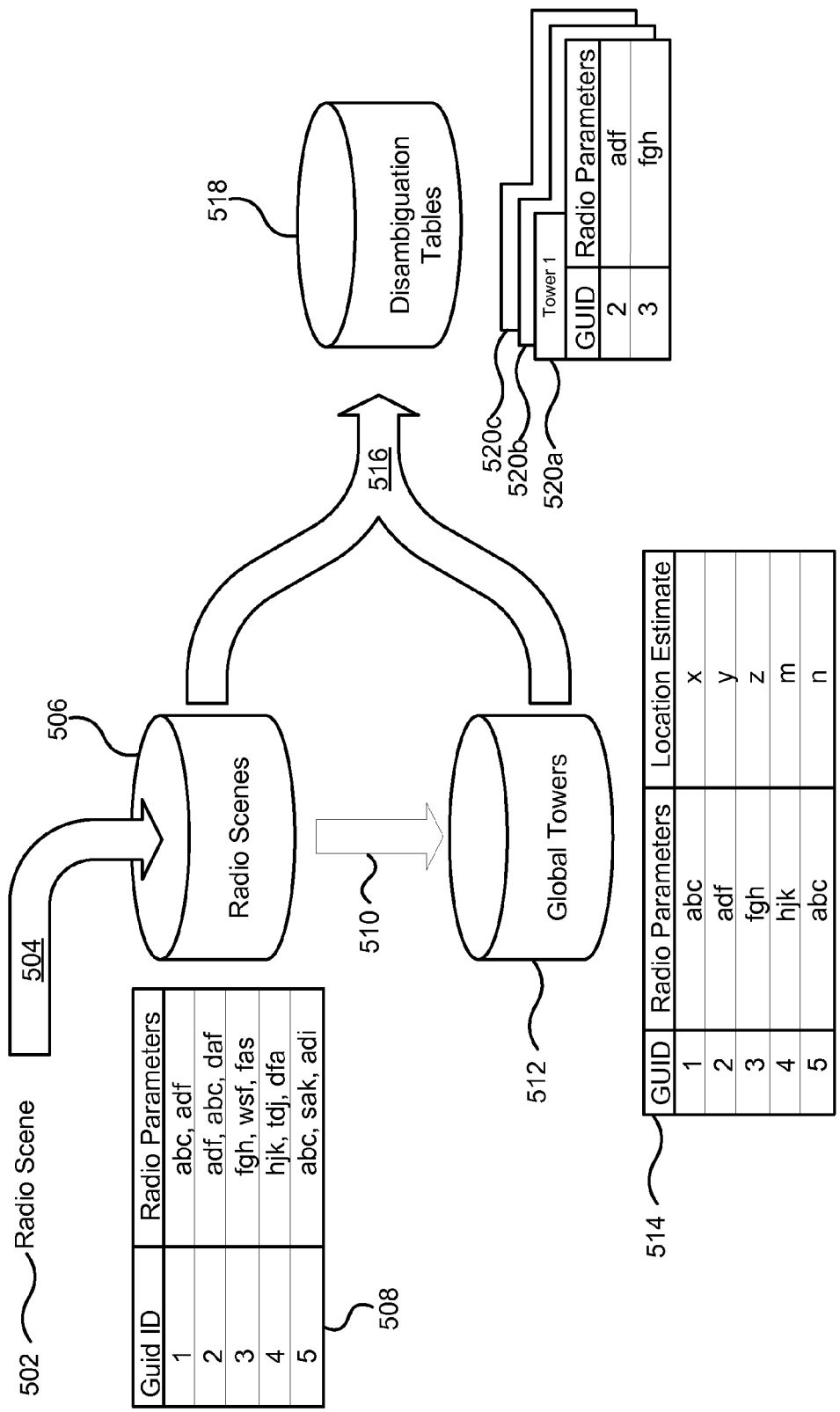
FIG. 5 schematically depicts a process of disambiguation of non-unique tower parameters.

FIG. 5 schematically depicts a process of disambiguation of non-unique tower parameters. FIG. 5 depicts contrived representations of the globally unique IDs, the radio parameters and location estimates. It will be appreciated that this is done for simplicity of the drawing and clarity of the description, and one skilled in the art will readily understand that the values will differ. For example, the location estimate is depicted as a single letter, it will be apparent that this is representative of some latitude and longitude.

In FIG. 5, a number of radio scenes 502 are received and stored, 504 in a corpus 506. Each of the radio scenes 508 includes the globally unique identifier of the base-station tower the mobile device that captured the radio scene was camped on at the time. The radio scene may include further information such as the non-unique tower parameters of neighboring towers that were visible by the device as well as signal strength information. Additionally, some of the radio scenes may include location information of the mobile device at the time the radio scene was captured. Mobile devices may participate in training a location service by reporting radio scenes along with their position, which may have been determined using GPS or another means. Five radio scenes from mobile devices that were camped on different towers are depicted; however in practice the radio scene corpus 506 may comprise thousands, millions or hundreds of millions of radio scenes.

The radio scene corpus 506 may be processed 510 in order to generate a global towers corpus 512. The global towers corpus 512 comprises globally unique IDs 514, associated radio parameters and location estimates for each of the towers uniquely identified in the radio scenes. The global towers corpus 512 can be generated by adding the globally unique ID from any radio scenes to the global towers corpus 512 if it is not already present. The global towers corpus 512 also includes the non-unique tower parameters of each of the towers as well as an estimate of the tower's position. The location estimate of a tower can be determined using the reported radio scenes in conjugation with the reported GPS locations.

Once the global towers corpus 512 is available, it can be processed 516, along with the radio scenes of the radio scene corpus 506 to generate the disambiguation information. The disambiguation information generation process 516 determines disambiguation information for each of the towers, although only three, 520a, 520b, 520c, are depicted. Each tower has its own disambiguation information that associates a non-unique parameter of a neighboring tower that may be detected by a mobile device that is camped on the tower with the globally unique tower ID of that tower. Once generated, the disambiguation information associated with each tower can be used to disambiguate radio scenes of mobile devices that were camped on the tower.

Figure 6:
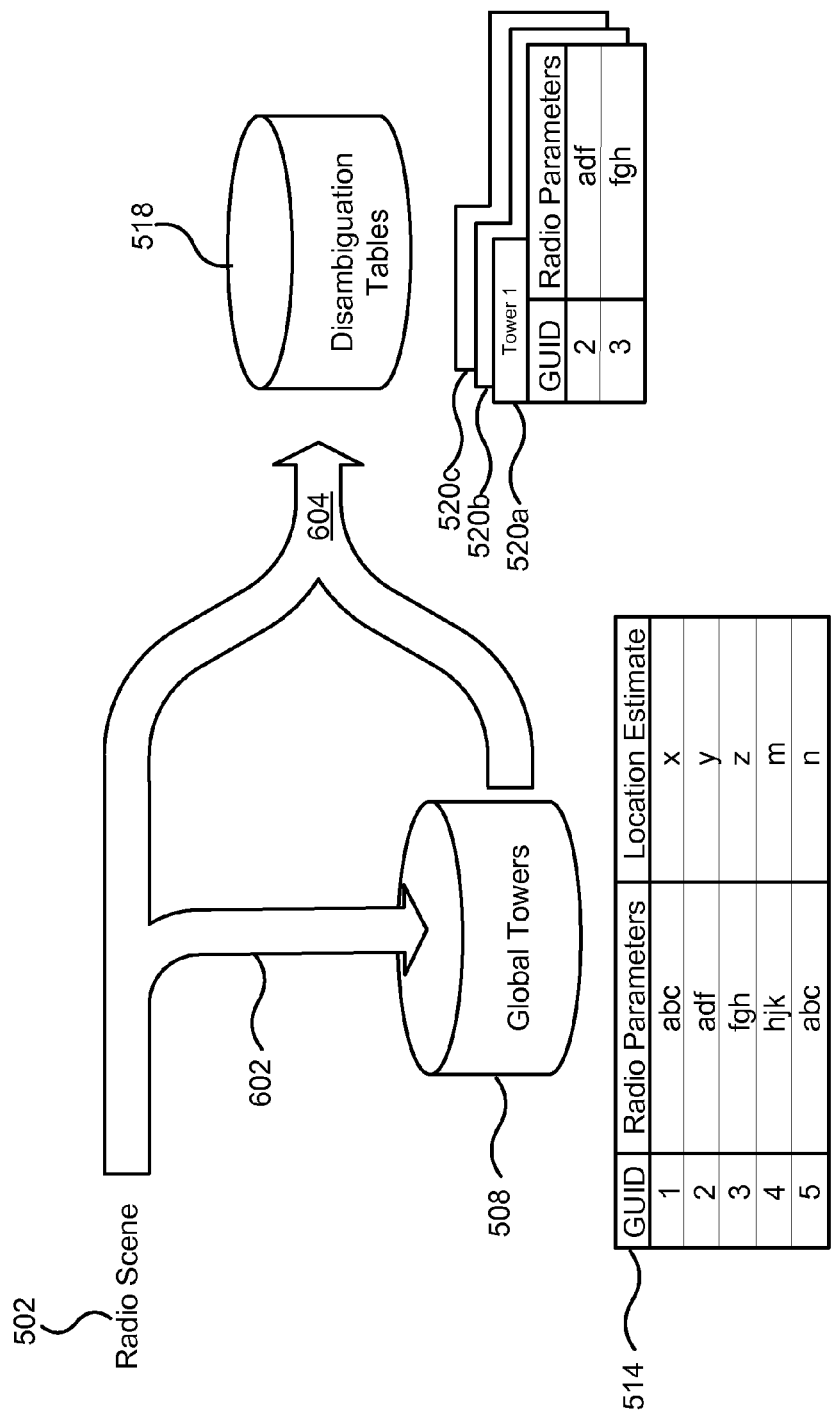
FIG. 6 schematically depicts a further process of disambiguation of non-unique tower parameters.

FIG. 6 schematically depicts a further process of disambiguation of non-unique tower parameters. The process depicted in FIG. 6 is substantially similar to that of FIG. 5 and as such, similar components will not be described again. In contrast to FIG. 5, which received and stored the radio scenes, FIG. 6 depicts a process which does not store the received radio scenes in a radio scene corpus. Instead, as each radio scene is received, it can be processed to add the global unique ID to the global towers corpus, if not already present, as well as to generate 604 any disambiguation information from the radio scene. The processing of the radio scenes is substantially the same as in FIG. 5; however, rather that accessing the radio scene from a radio scene corpus, it is processed as it is received from a mobile device. FIG. 6 may be suitable for maintain the global tower corpus and disambiguation corpus as new radio scenes are received. The process of FIG. 6 may require a large amount of processing power in order to be able to process the radio scenes as they are received. The process of FIG. 5 may require less computing power, as it processes the radio scenes off-line and as such, the time required to process a radio scene is not critical.

Figure 7:
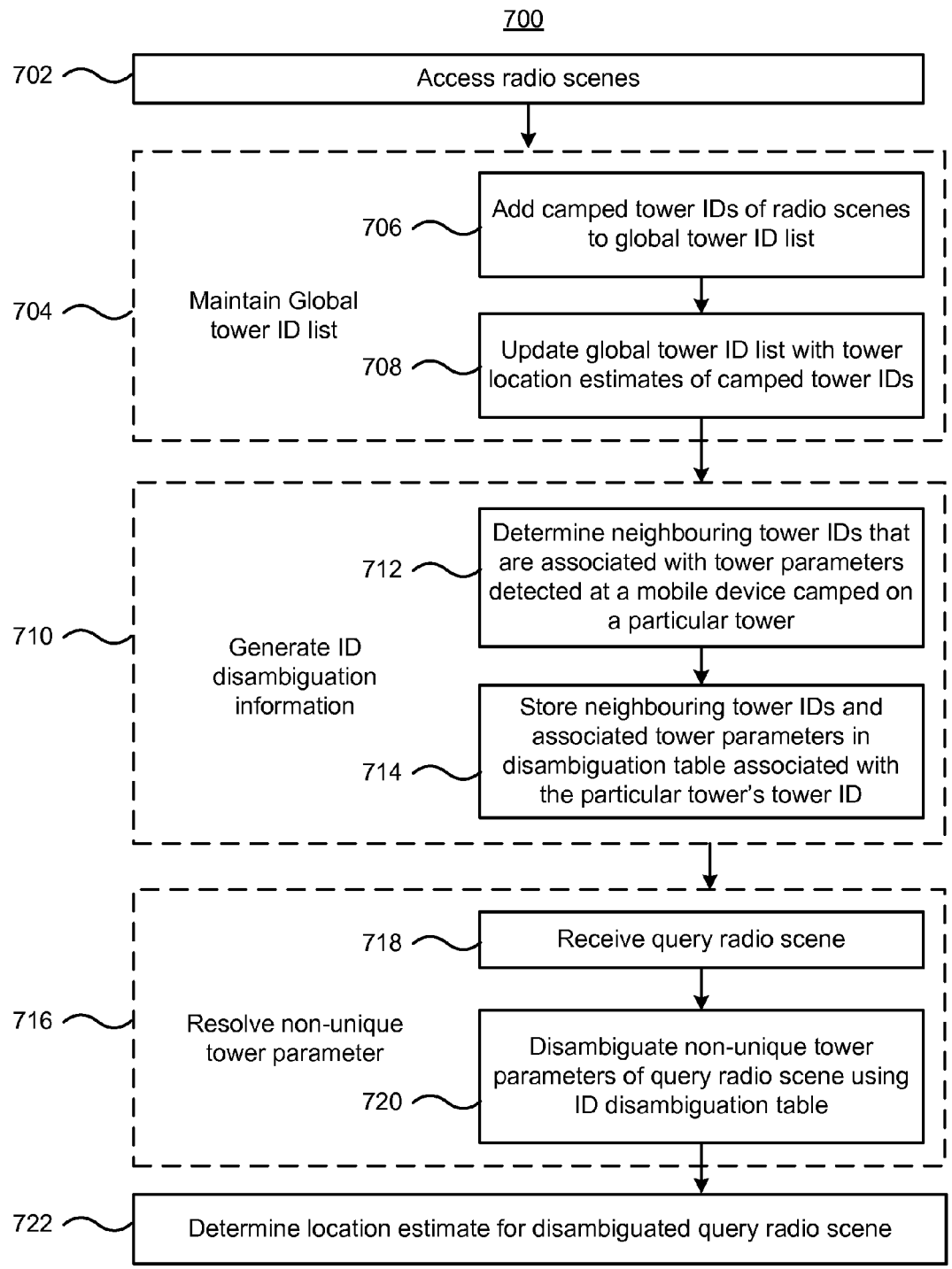
FIG. 7 depicts a method of determining a mobile device location using disambiguated non-unique tower parameters.

FIG. 7 depicts a method of determining a mobile device location using disambiguated non-unique tower parameters. The method 700 begins with accessing radio scenes (702). The accessed radio scenes may be retrieved from a corpus of previously captured radio scenes, or may be received from a mobile device. Regardless of if the radio scenes are accessed from a corpus or received from a mobile device, they are used to maintain a global tower list (704) which stored for each tower in the network or networks the globally unique tower ID, the tower's non-unique parameters and an estimate of the tower's location. The accessed radio scenes and global tower list are used to generate ID disambiguation information (710) for each of the towers. Once the disambiguation information is generated, it can be used to resolve non-unique tower parameters (716) in radio scenes received from mobile device to their associated globally unique tower IDs. The disambiguated radio scene with the resolved non-unique tower parameters can be used to determine location estimates of the mobile devices (722).

As described above, the global tower list provides an association between globally unique tower ID, associated non-unique tower parameter and a location estimate for each tower. The global tower list can be maintained (704) by adding tower IDs of the access radio scenes to the global towers list (706), if they are not already on the list. The radio scene provides an association between the globally unique ID and the non-unique parameters of the tower which is stored in the global towers list. The global tower list may be updated with tower location estimates for newly added towers (708). Additionally or alternatively, as radio scenes are processed that include GPS information, the global towers list may be processed to update the location estimates of the towers taking into consideration the GPS information.

The disambiguation information can be generated by determining neighboring tower's globally unique IDs that are associated with non-unique tower parameters detected at a mobile device that was camped on a particular tower when the radio scene was detected (712). The neighboring tower IDs and associated non-unique tower parameters can then be added to disambiguation information for the particular tower (714).

The generated disambiguation information can be used to resolve non-unique tower parameters of a radio scene that is used as a query for a mobile device's location. A query radio scene is received (718) that includes the globally unique ID of the base-station tower the mobile device was camped on as well as one or more non-unique tower parameters of neighboring cellular towers that were visible from the mobile device. The globally unique ID of the received query radio scene is used to determine the appropriate disambiguation information to use to disambiguate each of the non-unique tower parameters to the globally unique tower ID (720). Depending upon the location technique used, it may be preferred to only use globally unique identifiers and as such, if one of the non-unique parameters of a radio scene cannot be resolved to its globally unique ID, or if it can't be resolved with a high enough confidence level, than the non-unique parameter may be removed from the radio scene. Once the received query radio scene is resolved it can be used to determine a location estimate of the mobile device (722).

Figure 8:
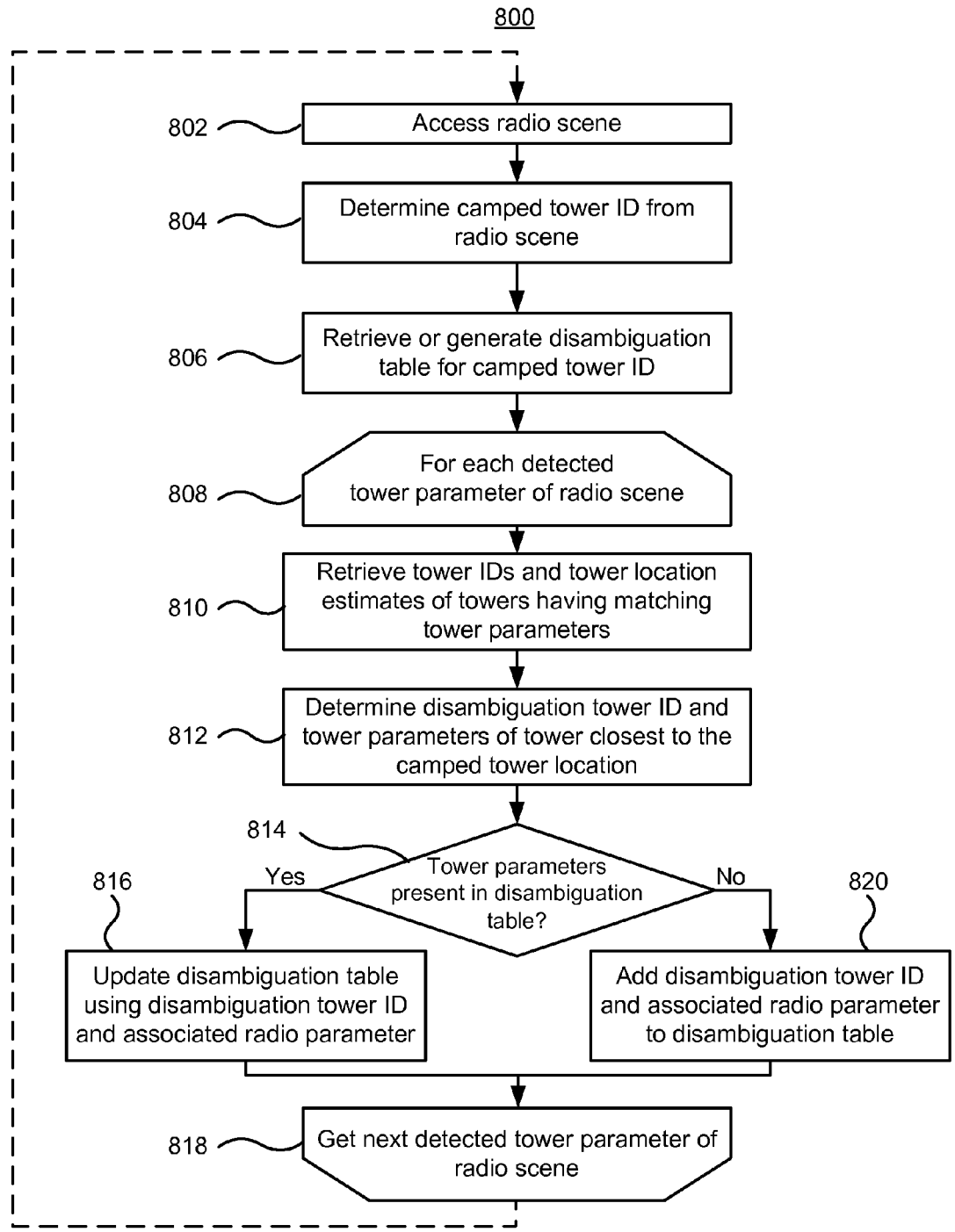
FIG. 8 depicts a method of generating disambiguation information for a cellular tower using a tower-distance based disambiguation technique.

FIG. 8 depicts a method of generating disambiguation information for a cellular tower using a tower-distance based disambiguation technique. In this method, the disambiguation information for a particular tower T is generated from all of the radio scenes reported from mobile devices that were camped on T. From these radio scenes there will be a number of non-unique parameters of neighboring towers. In order to map the non-unique parameter to the globally unique ID, all of the possible globally unique IDs that are associated with the non-unique parameter are retrieved from the global tower list along with the associated location estimate of the respective tower. The globally unique ID of the tower that is spatially, that is physically, the closest to the tower T's location is selected as the disambiguated tower ID. As such, when a mobile device is camped on tower T and reports the non-unique tower parameter, it will be resolved to the selected disambiguation tower ID.

The method 800 depicts the processing of a single radio scene received from a mobile device. It will be appreciated that a, potentially large, number of radio scenes are processed in a similar fashion to generate all of the disambiguation information. The method 800 begins with accessing a radio scene (802) and determining a globally unique tower ID of the tower the mobile device was camped on when the radio scene was captured (804). The globally unique tower ID of the base-station is used to retrieve the associated disambiguation information (806), or if no existing disambiguation information for the base-station tower exists to initialize it. The accessed radio scene may include zero or more non-unique tower parameters of neighboring towers. For each of the non-unique parameters of neighboring towers (808), the globally unique tower IDs and tower location estimates are retrieved for each tower that uses the non-unique tower parameters (810). It is then determined which of the retrieved location estimates is closest to the base-station tower's location estimate, and the tower located the closest is selected as the disambiguation tower (812). The method determines if the non-unique tower parameter being processed is present in the disambiguation table (814). If the non-unique tower parameters being processed are present in the disambiguation information (Yes at 814), the disambiguation table is updated so that the non-unique tower parameter is associated with the globally unique ID of the determined closest tower (816). If the non-unique parameter is not present in the disambiguation table (No at 814), the non-unique tower parameter and the globally unique ID of the determined closest tower is added to the disambiguation table (820). Once the disambiguation table has been updated or added to, the method gets the next non-unique parameter (818) from the radio scene and determines the tower using those parameters that is the closest to the base-station tower location. Once all of the non-unique parameters of the accessed radio scene have been processed, the method may return to access another radio scene, as depicted by the dashed line.

The method 800 described above only requires one radio scene report about each neighbor tower in order to disambiguate it, so the disambiguation information can be generated with relatively little data. However, this approach has no way of producing a confidence estimate about the disambiguation mapping. Due to complicated radio geometry there can sometimes be a sufficient error in the cellular tower location estimates so that a tower that in reality is further off from the base-station tower gets wrongly mapped to the non-unique parameter under consideration. Too many such wrong mappings can potentially degrade the geo-location performance. The method described further below with regard to FIG. 9 provides a confidence level in the disambiguation mapping.

Figure 9:
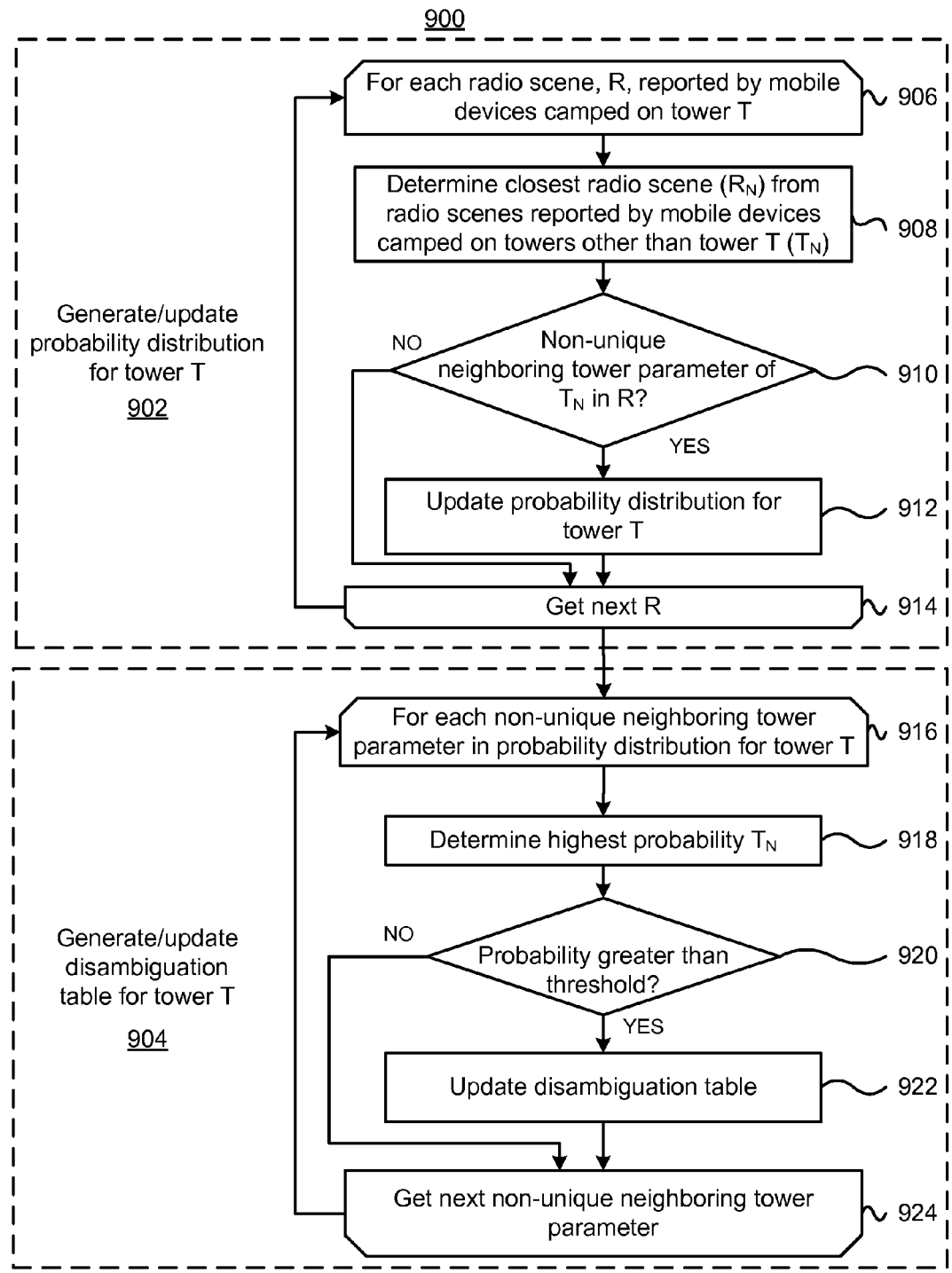
FIG. 9 depicts a further method of generating disambiguation information for a cellular tower, using a radio-scene-distance based disambiguation technique.

FIG. 9 depicts a further method of updating and generating disambiguation information for a cellular tower, using a radio-scene-distance based disambiguation technique. The method 900 may provide a more refined and potentially less error prone technique of populating the disambiguation table of a tower T than described above with regard to FIG. 8. Broadly, the method 900 generates or updates a probability distribution for tower T (902) based on a closeness or distance between radio scenes. In determining the closeness between radio scenes, fingerprint or vectors can be accomplished by using vector based techniques and may be determined as a distance between two vectors. The probability distribution provides for each non-unique neighboring tower parameter, for example UARFCN+PSC, reported by mobile devices camped on tower T and the probability that the non-unique neighboring tower parameter is associated with various towers $T_1$, $T_2$, . . . , etc. The probability distribution information is processed in order to generate or update the disambiguation table for tower T (904) such that a given non-unique neighboring tower parameter is associated to the one or more $T_N$'s having the highest probability in the probability distribution.

In the method described below, for a tower T, a list of probability distributions is generated or updated (902), which in turn is used to generate or maintain the disambiguation table for tower T (904). When generating/updating the probability information, all the radio scenes reported from mobiles camped on tower T are processed. For each of these radio scenes, R, (906) a search is made to determine the closest radio scene, $R_N$ from all the radio scenes reported from mobile device camped on tower, $T_N$, other than T (908). All radio scenes reported from mobile devices not camped on tower T are searched to find the closest radio scene to R. The camped tower for the radio scene determined to be the closest to R is called $T_N$. A check may be made to determine if the non-unique neighboring tower parameter corresponding to $T_N$ is in the radio scene R (910). If the non-unique identifier is in R (Yes at 910), then the probability of the [UARFCN+PSC, Tn] pair in the probability distribution information for tower T is updated (912) and the next radio scene R retrieved (914) and processed (906). The probability distribution information may provide a simple count as to the number of times a particular tower, T1, T2, . . . was determined to be associated with the UARFCN+PSC. If the UARFCN+PSC is not in R (No at 910), the probability information is not updated and the next radio scene R that is camped on tower T is retrieved (914) and processed (906). If the check to determine if the UARFCN+PSC is in R is not made, the probability distribution information can be updated with the UARFCN+PSC, $T_N$ once the closest radio scene $R_N$ is determined (not explicitly depicted in FIG. 9).

Once all radio scenes for tower T have been processed to produce a disambiguation probability information (902), then the disambiguation table can be generated or updated (904). For each non-unique neighboring tower parameter, such as UARFCN+PSC, in the probability distribution information (916), an evaluation of the probability distribution of the possible towers [T1, T2, . . . ] is made to determine both the most likely value of $T_N$ and the confidence in the value. For example, a given UARFCN+PSC may have been determined to be associated with different towers T1, T2, T3. In the processing described above, tower T1 may have been determined 8 times, tower T2 may have been determined once and tower T3 may also have been determined once. In such a case, the tower ID for which the distribution is peaked is naturally the optimal globally unique tower ID mapping of that non-unique tower parameter value and therefore tower T1 is the most probable as the confidence may be determined to be 80%. The degree to which the distribution is peaked also provides an indication of how much confidence there is in the mapping. The confidence level is checked to determine if it is above a confidence threshold (920) and if it is (Yes at 920), the disambiguation table for tower T is updated with the non-unique neighboring tower parameter:$T_N$ entry (UARFNC+PSC) (922) and the next non-unique neighboring tower parameter is retrieved (924) and processed (916). When the distribution is not sufficiently peaky, and below the threshold (No at 920), it is possible to disregard the non-unique tower parameter:$T_N$ and not add entry is not added to the disambiguation table thereby refusing to disambiguate it when resolving a radio scene. The next set of non-unique neighboring tower parameter is then retrieved (924) and processed (916). The ability to selectively disambiguate neighbors only when the data warrants sufficient confidence, means that this methods will typically not make any erroneous mappings and hence will not adversely affect geo-location performance.

Figure 10:
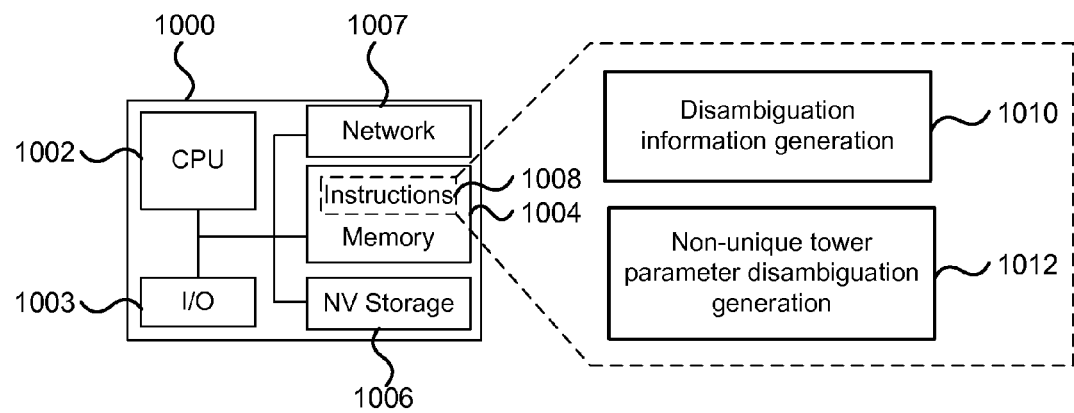
FIG. 10 depicts components of a device for disambiguating non-unique tower parameters.

FIG. 10 depicts components of a device for disambiguating non-unique tower parameters. The device may be a network server, or servers, although only a single CPU is depicted. The device 1000 comprises a processor 1002 for executing instructions. The computing device 1000 further comprises a memory 1004 for storing information. The device 1000 may also include non-volatile storage 1006 for storing information and an input/output interface 1003 enabling interaction with the computing device. A networking interface 1007 is provided to communicate with one or more networks to receive data from mobile devices. The memory 1004 stores instructions 1008, which when executed by the processor configure the device to provide functionality for generating disambiguation information 1010. The generation of the disambiguation information may be performed as described above.

The instructions 1008 may further comprise instructions that, when executed by the processor 1002 configure the device 1000 to provide functionality for disambiguating radio scenes 1012. The radio scene disambiguation may be performed at a server. In such a case a mobile device can provide a radio scene, which may need to be disambiguated and the server disambiguates the radio scene and then determines a location estimate based on the disambiguated radio scene. Additionally or alternatively, the radio scene disambiguation may be performed at the mobile device prior to sending a radio scene to a server for use in estimating the mobile device's location. The mobile device may retrieve disambiguation information associated with the current tower it is camped on, as well as other neighboring towers possibly, in order to be able to perform the disambiguation at the mobile device.

Although the description discloses example methods, system and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

What is claimed:

1. A method of cellular tower disambiguation for use in geo-location of mobile devices, the method comprising:
    identifying at least one cellular tower for generating identifier (ID) disambiguation information associated therewith;
    accessing a plurality of radio scenes detected by a plurality of mobile devices when each of the plurality of devices were camped on the at least one cellular tower, where each of the plurality of radio scenes detected by a mobile device of the plurality of mobile devices comprises:
        a unique tower identifier (ID) of the at least one cellular tower, and
        non-unique tower parameters of at least one neighboring cellular tower of the at least one cellular tower, wherein each of the non-unique tower parameters are common between the at least one neighboring cellular tower and at least other cellular tower, wherein the non-unique tower parameters were detected by the mobile device when camped on the at least one cellular tower, and wherein the at least one neighboring cellular tower is a cellular tower other than the at least one cellular tower on which the mobile device was camped and from which the mobile device received radio frequency signals;
    generating, from the plurality of radio scenes, ID disambiguation information for the at least one cellular tower, wherein the ID disambiguation information relates at least a subset of the non-unique tower parameters from each of the plurality of radio scenes to a unique tower identifier of a neighboring cellular tower of at least one cellular tower;
    receiving a query radio scene after the ID disambiguation information has been generated, wherein the query radio scene comprises:
        a unique ID of a cellular tower a mobile device that detected the query radio scene was camped on, and
        a respective non-unique tower parameter for each of one or more neighboring cellular towers detected by the mobile device;
    resolving the non-unique tower parameter of each of the one or more neighboring cellular towers using at least the ID disambiguation information of the at least one cellular tower, the resolving at least identifying a unique tower ID of each of the one or more neighboring cellular towers; and
    using the query radio scene with the resolved non-unique tower parameters to estimate a location of the mobile device that detected the radio scene.

2. The method of claim 1, further comprising updating a global tower ID list with the unique tower ID from the plurality of radio scenes, the global tower ID list associating a respective non-unique tower parameter of the at least one cellular tower and a tower location estimate of the at least one cellular tower.

3. The method of claim 2, wherein generating the ID disambiguation information obtained by performing comprises one of:
    performing tower-distance based disambiguation to associate a unique tower ID with a non-unique neighboring tower parameter based on the tower-distance between towers; and
    performing radio-scene-distance based disambiguation to associate a unique tower ID with a non-unique neighboring tower parameter based on a similarity between radio scenes.

4. The method of claim 3, wherein performing tower-distance disambiguation comprises:
    accessing one of the plurality of radio scenes;
    determining, for each of non-unique neighboring tower parameters of the accessed radio scene, unique tower IDs and tower location estimates of towers associated with the respective non-unique neighboring tower parameter in the list of unique tower IDs;
    determining a location estimate of the tower the respective mobile device was camped on when the accessed radio scene was detected;
    determining the unique tower ID and associated non-unique tower parameter having an associated location estimate that is closest to the tower location estimate of the at least one cellular tower; and
    storing the determined unique tower ID and associated non-unique tower parameter in the ID disambiguation information of the at least one cellular tower.

5. The method of claim 3, wherein performing radio scene disambiguation comprises:
    for each radio scene of the plurality of radio scenes:
        determining a nearest radio scene to the respective radio scene of the plurality of radio scenes, the nearest radio scene detected by a mobile device camped on a different cellular tower than the at least one cellular tower;
        determining a unique tower ID and associated non-unique neighboring tower parameter of the different cellular tower other than the particular tower from the global tower list; and
        updating probability distribution information for the non-unique neighboring tower parameter with the determined non-unique tower parameter.

6. The method of claim 5, further comprising
updating the ID disambiguation information of the at least one cellular tower with the determined unique tower ID and associated non-unique tower parameter having a highest probability in the probability distribution information and a confidence level above a confidence threshold.

7. The method of claim 5, wherein determining the nearest radio scene comprises:

determining the non-unique tower parameter associated with the unique tower ID of the at least one cellular tower;

determining a plurality of radio scenes detected by one or more respective mobile devices that were camped on a different cellular tower than the at least one cellular tower and that include the determined non-unique tower parameter associated with the unique tower ID of the at least one cellular tower; and determining from the determined plurality of radio scenes the nearest radio scene to the respective radio scene of the plurality of radio scenes.

8. The method of claim 1, wherein resolving the non-unique tower parameter of one or more neighboring cellular towers comprises removing the respective non-unique tower parameter from the query radio scene if at least one of:

a confidence level of the unique tower ID associated with the respective non-unique tower parameter is below a confidence threshold; and the respective non-unique tower parameter is not present in the disambiguation information.

9. The method of claim 1, wherein using the query radio scene with the resolved non-unique tower parameters to estimate a location of the mobile device comprises:

accessing a tower location estimate for each of the one or more neighboring cellular towers identified by each of the unique tower IDs identified based on the resolving; and determining the estimate of the location of the mobile device based on the accessed tower location estimates.

10. The method of claim 9, wherein the estimate of the location is a weighted centroid of the accessed estimates of the location for each of the one or more neighboring cellular towers.

11. A system for cellular tower disambiguation for use in geo-location of mobile devices, the system comprising:

a processor for executing instructions; and a memory coupled to the processor, the memory for storing instructions which when executed by the processor configures the system to:

identify at least one cellular tower for generating identifier (ID) disambiguation information associated therewith;

access a plurality of radio scenes detected by a plurality of mobile devices when each of the plurality of devices were camped on the at least one cellular tower, where each of the plurality of radio scenes detected by a mobile device the plurality of mobile devices comprises:

a unique tower identifier (ID) of the at least one cellular tower, and non-unique tower parameters of at least one neighboring cellular tower of the at least one cellular tower, wherein each of the non-unique tower parameters are common between the at least one neighboring cellular tower and at least other cellular tower, wherein the non-unique tower parameters were detected by the mobile device when camped on the at least one cellular tower, and wherein the at least one neighboring cellular tower is a cellular tower other than the at least one cellular tower on which the mobile device was camped and from which the mobile device received radio frequency signals;

generate, from the plurality of radio scenes, ID disambiguation information for the at least one cellular tower, wherein the ID disambiguation information relates at least a subset of the non-unique tower parameters from each of the plurality of radio scenes to a unique tower identifier of a neighboring cellular tower at least one cellular tower;

receive a query radio scene after the ID disambiguation information has been generated, wherein the query radio scene comprises:

a unique ID of a cellular tower a mobile device that detected the query radio scene was camped on, and a respective non-unique tower parameter for each of one or more neighboring cellular towers detected by the mobile device;

resolve the non-unique tower parameter of each of the one or more neighboring cellular towers using at least the ID disambiguation information of the at least one cellular tower, the resolving at least identifying a unique tower ID of each of the one or more neighboring cellular towers; and use the query radio scene with the resolved non-unique tower parameters to estimate a location of the mobile device that detected the radio scene.

12. The system of claim 11, wherein the executed instructions further configure the system to update a global tower ID list with the unique tower ID from the plurality of radio scenes, the global tower ID list associating a respective non-unique tower parameter of the at least one cellular tower and a tower location estimate of the at least one cellular tower.

13. The system of claim 12, wherein the executed instructions further configure the system to generate the ID disambiguation information by one of:

performing tower-distance based disambiguation to associate a unique tower ID with a non-unique neighboring tower parameter based on the tower-distance between towers; and performing radio-scene-distance based disambiguation to associate a unique tower ID with a non-unique neighboring tower parameter based on a similarity between radio scenes.

14. The system of claim 13, wherein performing tower-distance disambiguation comprises:

accessing one of the plurality of radio scenes;

determining, for each of non-unique neighboring tower parameter of the accessed radio scene, unique tower IDs and tower location estimates of towers associated with the respective non-unique neighboring tower parameter in the list of unique tower IDs;

determining a location estimate of the tower the respective mobile device was camped on when the accessed radio scene was detected;

determining the unique tower ID and associated non-unique tower parameter having an associated location estimate that is closest to the tower location estimate of the at least one cellular tower; and storing the determined unique tower ID and associated non-unique tower parameter in the ID disambiguation information of the at least one cellular tower.

15. The system of claim 13, wherein performing radio scene disambiguation comprises:

for each radio scene of the plurality of radio scenes:

determining a nearest radio scene to the respective radio scene of the plurality of radio scenes, the nearest radio scene detected by a mobile device camped on a different cellular tower than the at least one cellular tower;

determining a unique tower ID and associated non-unique neighboring tower parameter of the different cellular tower from the global tower list; and updating probability distribution information for the non-unique neighboring tower parameter with the determined non-unique tower parameter.

16. The system of claim 15, wherein the executed instructions further configure the system to:
update the ID disambiguation information of the at least one cellular tower with the determined unique tower ID and associated non-unique tower parameter having a highest probability in the probability distribution information and a confidence level above a confidence threshold.

17. The system of claim 15, wherein determining the nearest radio scene comprises:
determining the non-unique tower parameter associated with the unique tower ID of the at least one cellular tower;
determining a plurality of radio scenes detected by one or more respective mobile devices that were camped on a different cellular tower than the at least one cellular tower and that include the determined non-unique tower parameter associated with the unique tower ID of the at least one cellular tower; and
determining from the determined plurality of radio scenes the nearest radio scene to the respective radio scene of the plurality of radio scenes.

18. The system of claim 11, wherein resolving the non-unique tower parameter of one or more neighboring cellular towers comprises removing the respective non-unique tower parameter from the query radio scene if at least one of:
a confidence level of the unique tower ID associated with the respective non-unique tower parameter is below a confidence threshold; and
the respective non-unique tower parameter is not present in the disambiguation information.

19. The system of claim 11, wherein using the query radio scene with the resolved non-unique tower parameters to estimate a location of the mobile device comprises:
accessing a tower location estimate for each of the one or more neighboring cellular towers identified by each of the unique tower IDs identified based on the resolving; and
determining the estimate of the location of the mobile device based on the accessed tower location estimates.

20. A non-transitory computer readable memory, containing instructions for execution by a processor, the instructions comprising:
identifying at least one cellular tower for generating identifier (ID) disambiguation information associated therewith;
accessing a plurality of radio scenes detected by a plurality of mobile devices when each of the plurality of devices were camped on the cellular tower, where each of the plurality of radio scenes detected by a mobile device the plurality of mobile devices comprises:
a unique tower identifier (ID) of the at least one cellular tower, and
non-unique tower parameters of at least one cellular tower neighboring cellular tower of the at least one cellular tower, wherein each of the non-unique tower parameters are common between the at least one neighboring cellular tower and at least other cellular tower, wherein the non-unique tower parameters were detected by the mobile device when camped on the at least one cellular tower, and wherein the at least one neighboring cellular tower is a cellular tower other than the at least one cellular tower on which the mobile device was camped and from which the mobile device received radio frequency signals;
generating, from the plurality of radio scenes, ID disambiguation information for the at least one cellular tower, wherein the ID disambiguation information relates at least a subset of the non-unique tower parameters from each of the plurality of radio scenes to a unique tower identifier of a neighboring cellular tower of at least one cellular tower
receiving a query radio scene after the ID disambiguation information has been generated, wherein the query radio scene comprises:
a unique ID of a cellular tower a mobile device that detected the query radio scene was camped on, and
a respective non-unique tower parameter for each of one or more neighboring cellular towers detected by the mobile device;
resolving the non-unique tower parameter of each of the one or more neighboring cellular towers using at least the ID disambiguation information of the at least one cellular tower, the resolving at least identifying a unique tower ID of each of the one or more neighboring cellular towers; and
using the query radio scene with the resolved non-unique tower parameters to estimate a location of the mobile device that detected the radio scene.

* * * * *